United States Patent
Gerges

(10) Patent No.: US 7,717,275 B2
(45) Date of Patent: May 18, 2010

(54) INTEGRATED PERFORATED FLOCCULATING BAFFLE SYSTEM

(76) Inventor: Hany Zarif Gerges, 247 Jasmine Way, Danville, CA (US) 94506

(*) Notice: Subject to any disclaimer, the term of this patent is extended or adjusted under 35 U.S.C. 154(b) by 3 days.

(21) Appl. No.: 12/154,806

(22) Filed: May 27, 2008

(65) Prior Publication Data

US 2009/0294352 A1    Dec. 3, 2009

(51) Int. Cl.
*B01D 21/08* (2006.01)
(52) U.S. Cl. .......... 210/519; 210/521; 210/532.1; 210/541
(58) Field of Classification Search .......... 210/519, 210/521, 528, 532.1, 541
See application file for complete search history.

(56) References Cited

U.S. PATENT DOCUMENTS

| | | | | |
|---|---|---|---|---|
| 3,175,692 A | * | 3/1965 | Vrablik | 210/519 |
| 3,486,628 A | * | 12/1969 | Darby | 210/528 |
| 3,770,131 A | * | 11/1973 | Davis et al. | 210/519 |
| 4,132,652 A | * | 1/1979 | Anderson et al. | 210/521 |
| 4,270,676 A | * | 6/1981 | Green | 210/519 |
| 5,679,265 A | * | 10/1997 | Van Schie | 210/521 |
| 5,830,355 A | * | 11/1998 | Harris | 210/519 |
| 6,099,743 A | * | 8/2000 | Pedersen | 210/519 |
| 6,315,898 B1 | * | 11/2001 | Bull | 210/521 |
| 6,736,275 B2 | * | 5/2004 | Schneider et al. | 210/519 |
| 6,800,209 B2 | * | 10/2004 | Wright | 210/519 |
| 7,243,802 B2 | * | 7/2007 | Albertson | 210/519 |
| 2007/0209996 A1 | * | 9/2007 | Zhou | 210/519 |

\* cited by examiner

*Primary Examiner*—Christopher Upton
(74) *Attorney, Agent, or Firm*—Shook Hardy & Bacon LLP

(57) ABSTRACT

An integrated perforated flocculating baffle system for use in a clarifier tank with a tank bottom, and a peripheral vertical wall bounding the interior of the tank is formed by a plurality of individual baffles interconnected and mounted to a support element, extending vertically inside the tank forming a rigid wall of perforated baffles allowing incoming water to pass through its openings and through gaps between individual baffles promoting flocculation of the suspended matter, and distributing the flow equally and uniformly throughout the settling the clarifiers. Each baffle includes solid linear and curved sections followed by perforated sections. The baffles are interconnected along the length by cross connectors to ensure rigidity. The resulting system provides an integrated perforated baffle system by which the water flows uniformly within the tank and flocculation is enhanced.

14 Claims, 7 Drawing Sheets

INTEGRATED PERFORATED FLOCCULATING BAFFLE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not applicable

INCORPORATION-BY-REFERENCE OF MATERIAL SUBMITTED ON A CMPCAT DISC

Not Applicable

BACKGROUND OF THE INVENTION

1. Field of the Invention

This invention relates to a system of integrated perforated flocculating baffles for use in solids separation and settling tanks, the baffle system consisting of a plurality of interconnected perforated baffles attached to and forming a flocculation compartment.

2. Description of the Related Art

The present invention relates to a system of baffles for a tank for separation of solids from the water by gravitational forces in water and wastewater treatment. The tank where the inventive system of baffle device is used is typically circular, square or rectangular in shape.

In water and wastewater treatment where sedimentation tanks, also known in the art as clarifiers or settling tanks, are used, the efficiency of the tanks is governed by the amount of suspended matter removed. Density currents resulting from the difference in specific gravity between suspended matter and water or the differential temperature between the atmosphere and the water contained in the tank represent a major deterrent to the tank removal efficiency. Density difference creates strong currents and hydraulic short circuiting within the tank reducing the effective volume available for flocculation and settling of the suspended matter and re-suspends the settled solids. To enhance hydraulics regime and flocculation within the tank, several types of feedwells (also known as center wells) have been developed over the years mainly for circular clarifiers.

Representative examples of prior art of feedwells and the like are disclosed in U.S. Pat. No. 2,702,124 to Stengel, U.S. Pat. No. 3,175,692 to Edgerton, U.S. Pat. No. 3,486,628 to Darby, U.S. Pat. No. 3,966,617 to Zaenkert, U.S. Pat. No. 4,270,676 to Green, U.S. Pat. No. 4,985,148 to Monteith, U.S. Pat. No. 5,378,378 to Meurer, U.S. Pat. No. 5,384,049 to Murphy, U.S. Pat. No. 5,714,068 to Brown, U.S. Pat. No. 6,099,743 to Pederson, U.S. Pat. No. 6,276,537 to Esler and U.S. Pat. No. 6,800,209 to Wright. All of these feedwells and energy dissipating inlet designs emphasized the importance of dissipating the energy of the incoming water as means for improving flocculation. None of these prior art feedwells or energy dissipating inlets was designed to reduce or eliminate the currents produced by difference in specific gravity between suspended solids and water or the differential temperature between the atmosphere and the water contained in the clarifier. In addition, many of these prior art feedwells and energy dissipating inlets are limited in application to certain configuration of clarifiers. Moreover, no prior art reference discloses a plurality of interconnected individual perforated baffles with each baffle including a linear solid and curved sections followed by open sections, supported on the top to a structural element.

It is, therefore, an object of the present invention to provide a system of plural, interconnected baffles, curved to match the peripheral contour of the circular feedwell in case of a circular tank or, alternatively, linear to match the supporting structure in case of a non-circular tank, forming a rigid wall of perforated baffle system extending downward inside the tank.

BRIEF SUMMARY OF THE INVENTION

The present invention provides an integrated perforated flocculating baffle system designed to satisfy the aforementioned need. The integrated perforated flocculating baffle system of the present invention both enhances flocculation and reduces the adverse effect of the solids-induced or thermal-induced density currents by eliminating flow entrainment from the main settling zone of the clarifiers into the flocculation zone and providing nearly uniform flow through its perforated surface.

The present invention presents an interconnected baffle system forming a rigid wall of perforated baffles allowing incoming water to pass through its openings promoting flocculation of the suspended matter, and distributing the flow equally and uniformly throughout the settling zone of the clarifiers. The baffle system includes a plurality of interconnected perforated baffles curved to match the peripheral contour of the circular feedwell in case of a circular clarifier or, alternatively, linear to match the supporting structure in case of a non-circular tank. The baffle system divides the clarifier into two compartments; one before and one after the baffle system. The compartment before the baffle system is for flocculation of the suspended matter and dissipating the energy of the incoming water, and the compartment after the baffle system is for settling of suspended matter. Each baffle includes linear solid and curved sections followed by perforated sections. Baffles are secured on the top to the feed well, in case of a circular clarifier, and a supporting beam, in case of a non-circular clarifier in a curtain-like fashion. The baffles are interconnected along the length by cross connectors to ensure rigidity.

In a currently preferred implementation, the individual baffles are fabricated from a molded reinforced fiberglass composite as one piece. Thus, each molded baffle incorporates the linear and curved solids sections and perforated sections. Most preferably, the thickness of the fiberglass panels is in the range from $3/16^{th}$ to $1/2^{th}$ of an inch, a range that provide structural integrity to the whole baffle system.

The features and advantages of the present invention will become apparent to those skilled in the art upon reading of the following detailed description when taken in conjunction with the drawings where there is shown an illustrative embodiment of the invention and the claims where there is indication of the scope of the invention.

BRIEF DESCRIPTION OF THE DRAWINGS

In the following detailed description, reference will be made to the attached drawings in which.

DETAILED DESCRIPTION OF THE INVENTION

Figure 1:
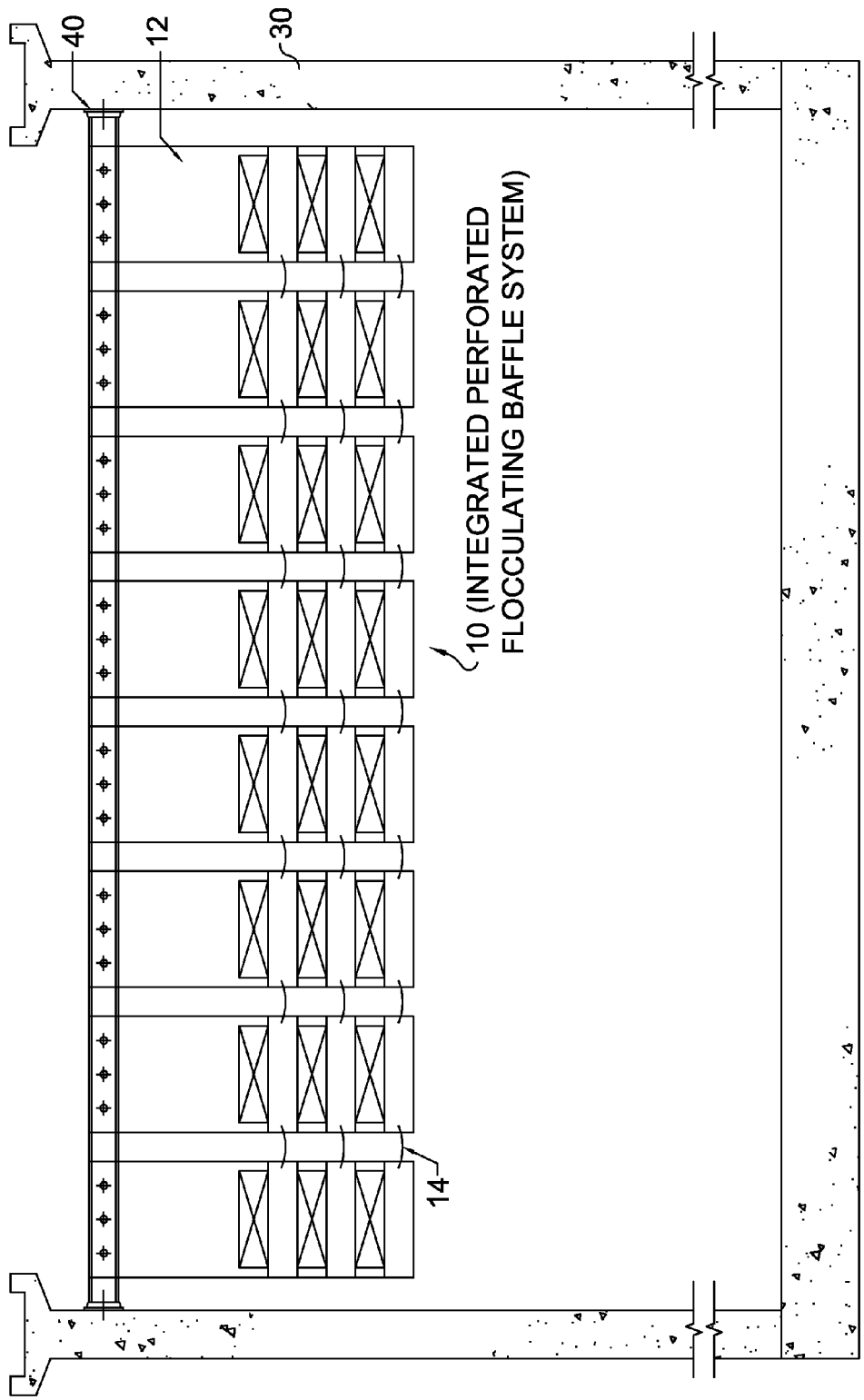
FIG. 1 is a perspective view of an integrated perforated flocculating baffle system of the present invention mounted to a support beam in rectangular clarifier.

Referring to the drawings and particularly to FIG. 1, there is illustrated an integrated perforated flocculating baffle system, generally designated 10, of the present invention, which is mounted to a support beam 40, in a rectangular clarifier tank 30. Basically, the integrated baffle system 10 includes individual baffles 12, and cross connectors 14.

Figure 2:
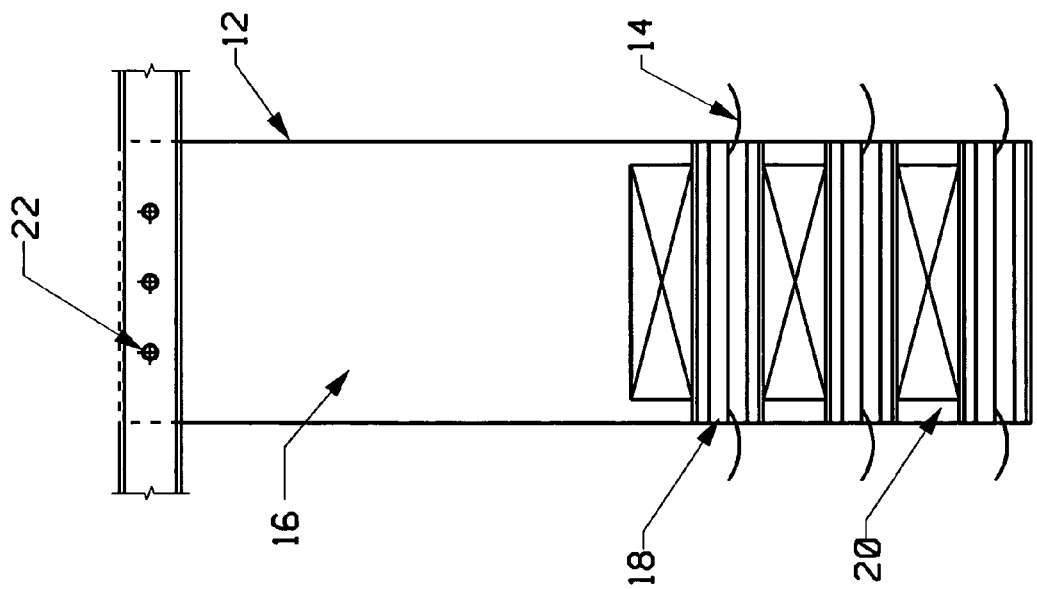
FIG. 2 is a detailed view of the individual baffle.

Referring to FIG. 2, detailed view of the individual baffle 12 is shown. Each baffle consists of a linear solid section 16, curved sections 18 and open sections 20. The width, length and thickness of individual baffle 12 are functions of the size, shape and type of the clarifier. Generally, the width of the individual baffle ranges between 6 inches to 96 inches. Mounting holes 22 to support individual baffles from support beam 40 are drilled in the linear solid section 16.

Figure 3:
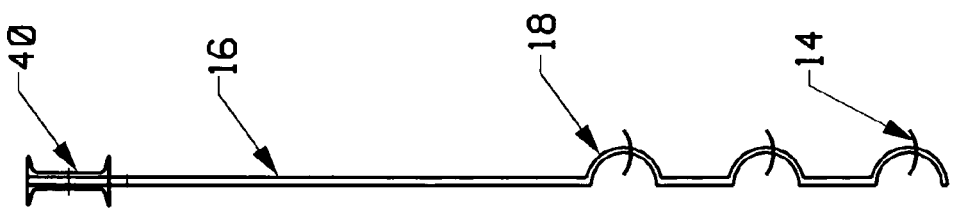
FIG. 3 is a cross section through the solid portion of the baffle.

Referring to FIG. 3, the size of the linear solid section 16 is a function of the size of baffle 12. Generally, the length of linear sound section 16 ranges between 6 inches to 60 inches. The thickness of linear solid section 16 could be $3/16^{th}$ of an inch thick to provide more rigidity to the baffle system 10. The shape of curved sections 18 depends on the characteristics of the water passing through the baffle. Radial angle for the curved section 18 could range from 180 degrees (half circle) to 90 degrees.

Figure 4:
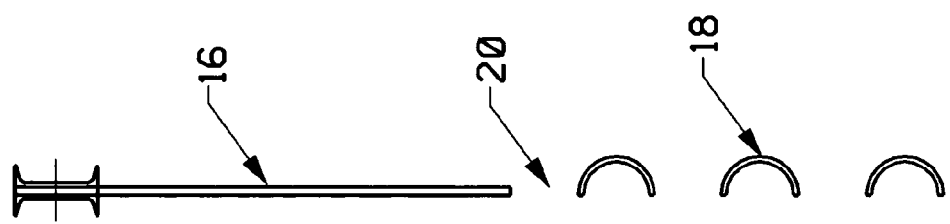
FIG. 4 is a cross section through the perforated portion of the baffle.

Referring to FIG. 4, the length of the open section 20 ranges between 2 inches to 32 inches depending on the characteristics of the incoming water and suspended matter.

Figure 5:
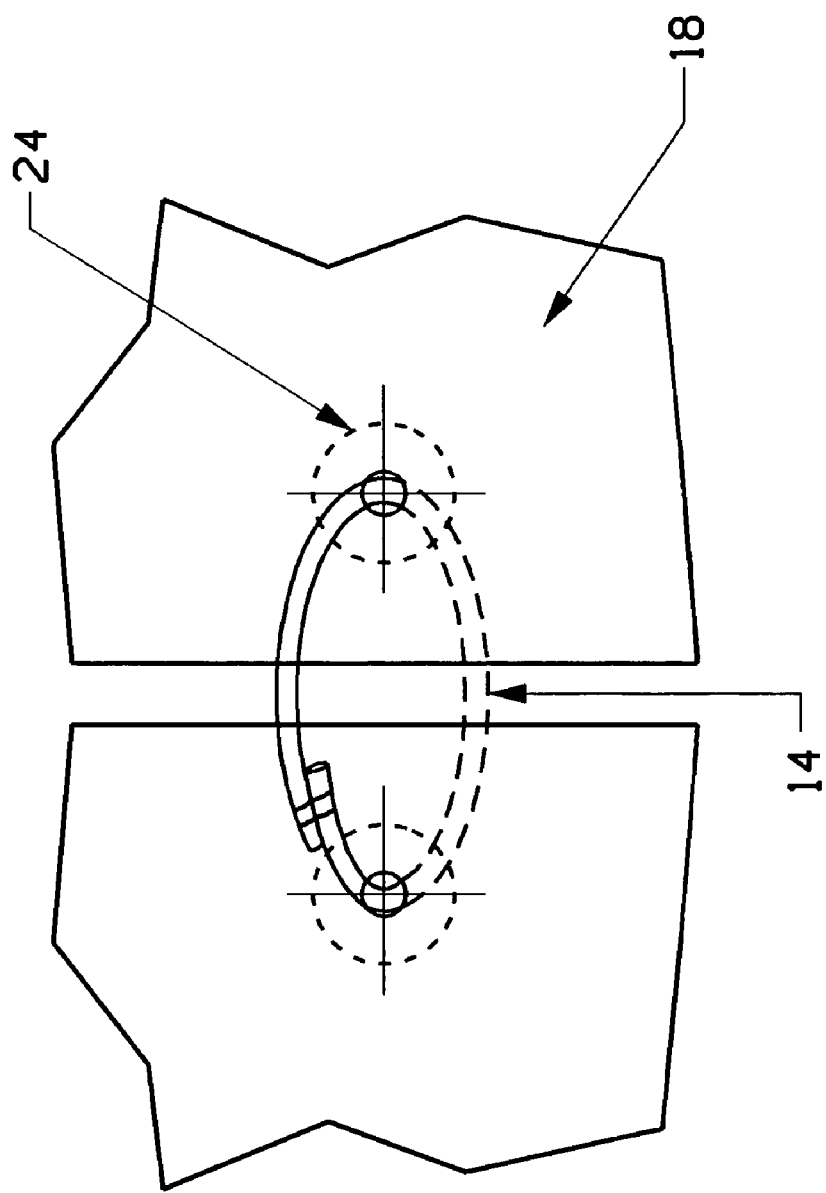
FIG. 5 is a detailed view of the cross connectors the baffles along the length.

Referring to FIG. 5, the cross connector 14, in one embodiment, includes a cable clamp and stainless steel washer 24.

Figure 6:
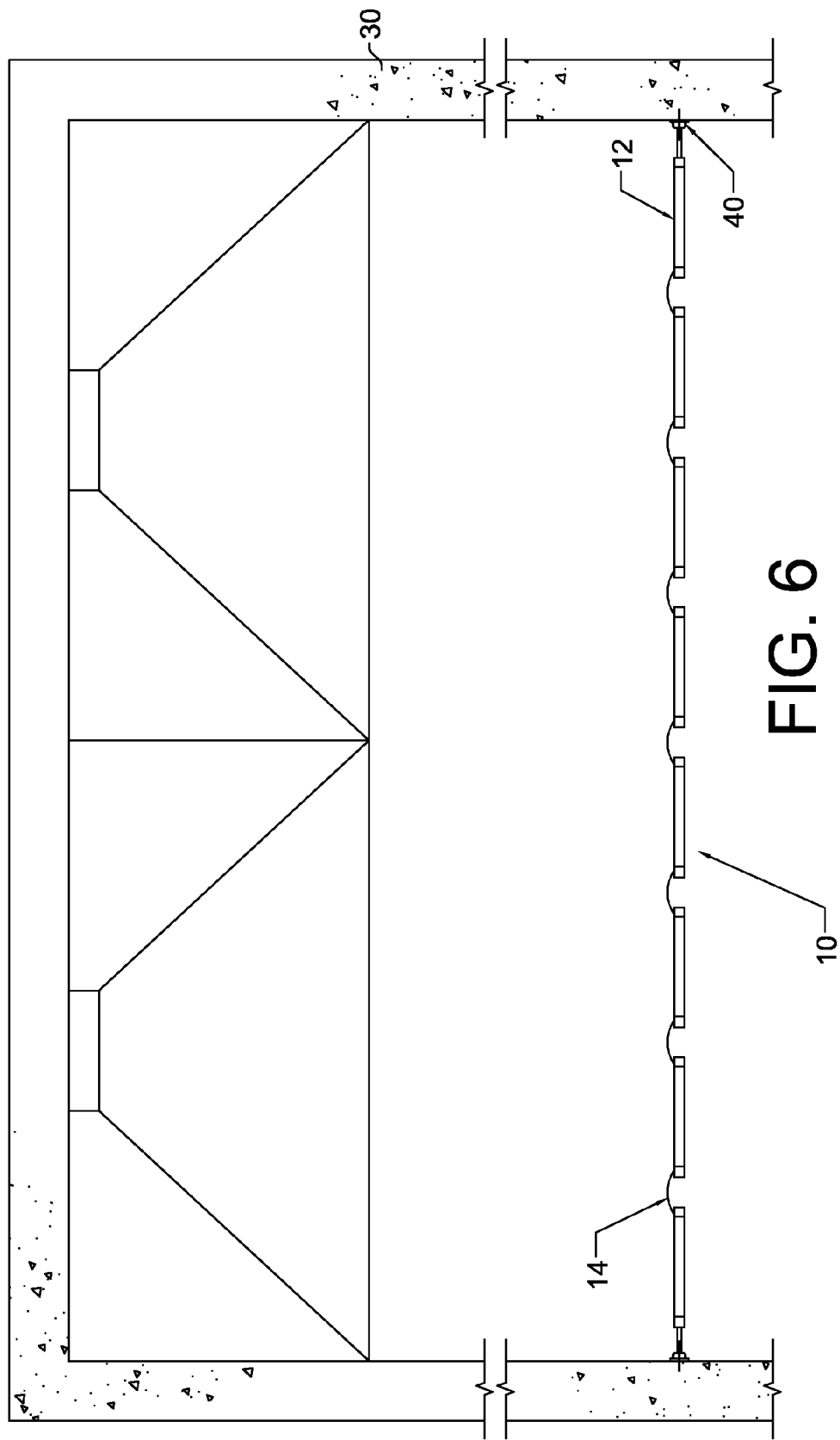
FIG. 6 is a partial plan view of an integrated perforated flocculating baffle system in a non-circular tank.

Referring to FIG. 6, the integrated baffle system 10 in the rectangular clarifier tank 30 is shown in plan view. As noted above, the integrated baffle system 10 includes individual baffles 12 mounted to a support beam 40 within the clarifier tank 30 with cross connectors 14 between the individual baffles.

Figure 7:
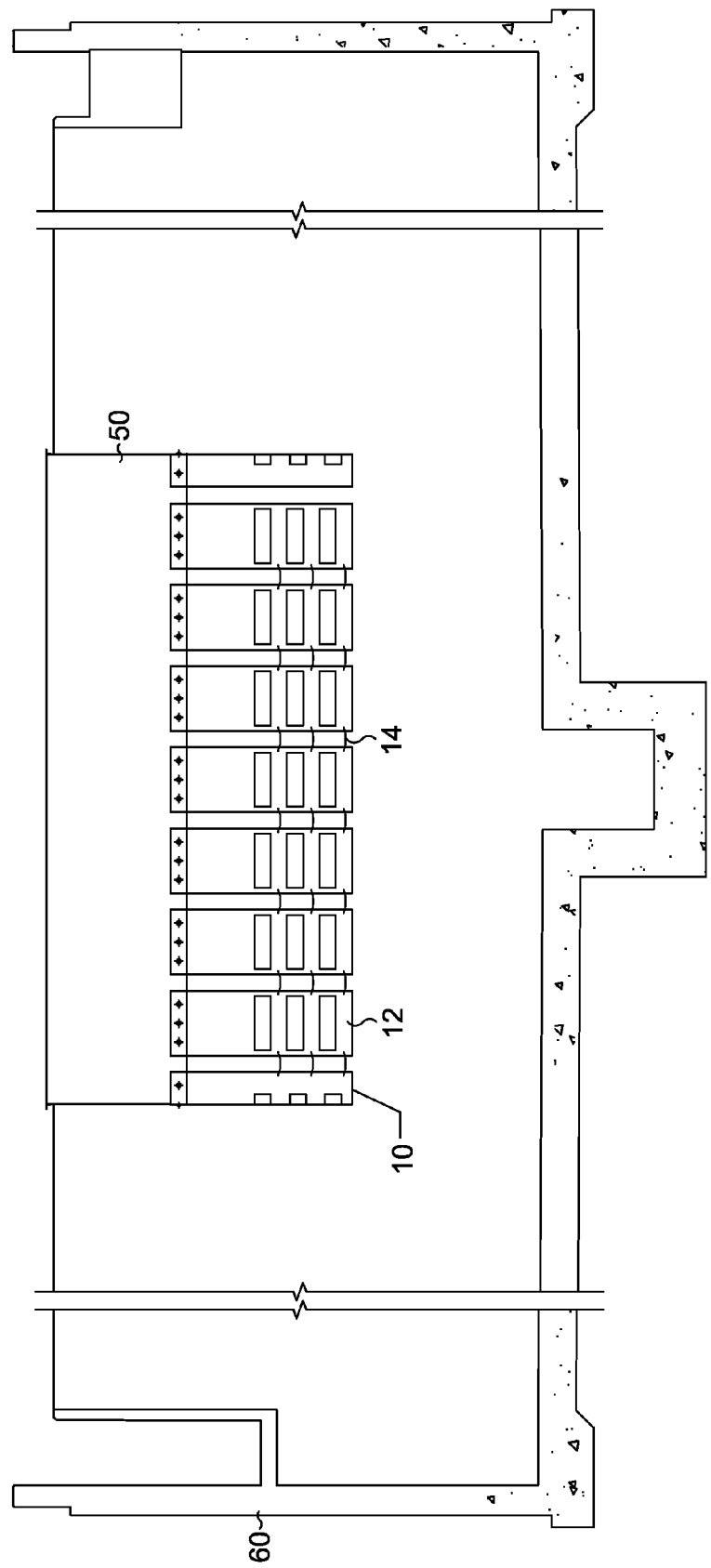
FIG. 7 is a cross section view of an integrated perforated flocculating baffle system in a circular tank.

Referring to FIG. 7, the integrated baffle system 10 with individual baffles 12 and cross connectors 14 is shown as being mounted to a feed well 50 in a circular clarifier tank 60.

What is claimed is:

1. An integrated perforated flocculating baffle system in a clarifier tank for gravitationally separating suspended matter from liquid, the clarifier tank having a bottom and at least one side wall bounding the liquid contained in the clarifier tank, said baffle system comprising:

a plurality of interconnected baffles mounted within the clarifier tank dividing the clarifier tank into a flocculating and energy dissipation compartment and a settling compartment, wherein each said baffle comprises a solid section which is linear in a vertical cross section extending downwardly from a support within the clarifier tank and a plurality of sections which are linear in a vertical cross section and each have at least one opening alternating with a plurality of solid sections which are curved in a vertical cross section below said linear solid section;

said baffles being secured together along their lengths in such a manner as to form a gap between adjacent baffles while forming a substantially rigid wall of baffles.

2. The baffle system of claim 1, wherein each baffle has a width of about 6 inches to 96 inches.

3. The baffle system of claim 1, wherein the solid section which is linear in a vertical cross section of each baffle is about 6 inches to about 60 inches in length.

4. The baffle system of claim 1, wherein each of said plurality of solid sections which are curved in a vertical cross section has a radial angle from 45 to 180 degrees.

5. The baffle system of claim 1, wherein each opening is about 2 inches to about 12 inches in length.

6. The baffle system of claim 1, wherein each baffle is molded on a reinforced fiberglass composite.

7. The baffle system of claim 6, wherein each baffle has a thickness of about $3/16^{th}$ of an inch to about $1/2$ of an inch.

8. The baffle system of claim 1, wherein each baffle is made of stainless steel.

9. The baffle system of claim 1, wherein the solid section which is linear in a vertical cross section of each baffle further comprises an imbedded stainless steel plate and mounting holes for receiving mounting bolts forming surface-to-surface engagement for securing each baffle to the support within the clarifier tank.

10. The baffle system of claim 1, wherein the clarifier tank comprises a circular tank.

11. The baffle system of claim 10, wherein the baffle system is mounted to a clarifier feedwell.

12. The baffle system of claim 10, wherein each baffle is curved in a horizontal cross section with a radius of curvature corresponding with a radius of curvature of the at least one side wall of the clarifier tank.

13. The baffle system of claim 1, wherein the clarifier is a non-circular tank and the baffle system is mounted to a support beam.

14. The baffle system of claim 13, wherein each baffle is linear in a horizontal cross section.

* * * * *